US006317184B1

(12) United States Patent
Kwan et al.

(10) Patent No.: US 6,317,184 B1
(45) Date of Patent: Nov. 13, 2001

(54) LIQUID CRYSTAL DISPLAY WITH ENHANCED CHARACTER VISIBILITY

(75) Inventors: Sik Piu Kwan, Suwanee; William D. Poynter, Duluth, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/250,857

(22) Filed: Feb. 17, 1999

(51) Int. Cl.[7] .................................................. G02F 1/1343

(52) U.S. Cl. ............................................ 349/142; 349/139

(58) Field of Search .................................... 349/139, 142; 345/50, 34

(56) References Cited

U.S. PATENT DOCUMENTS 4,002,886 1/1977 Sundelin ......................... 235/61.7 R
4,237,460 12/1980 Huguenin ............................ 340/756
4,500,880 2/1985 Gomersall et al. ............. 340/825.35
4,924,363 5/1990 Kornelson ............................ 362/125
5,172,314 12/1992 Poland et al. ........................ 364/401
5,448,226 9/1995 Failing, Jr. et al. ............ 340/825.35
5,559,528 * 9/1996 Ravid et al. ......................... 345/117
5,748,568 * 5/1998 Harrison ................................ 368/82

FOREIGN PATENT DOCUMENTS 195 24 086 1/1997 (DE) .
109473 5/1984 (EP) .
834854 4/1998 (EP) .

* cited by examiner

*Primary Examiner*—William L. Sikes
*Assistant Examiner*—Dung Nguyen
(74) *Attorney, Agent, or Firm*—Paul W. Martin

(57) ABSTRACT

A liquid crystal display (LCDS) which has higher contrast characters than previously available LCDs, particularly LCDs used in electronic price labels. The LCD includes a number of characters containing segments including four vertical segments and three horizontal segments arranged in a figure-8 shape. The four vertical segments have a width determined by a segment width to character width ratio of about 0.208–0.283 and the three horizontal segments have a width determined by a segment height to character height ratio of about 0.100–0.150. The LCD also includes two diagonal segments defined by two parallel lines to enhance visibility of characters such as the letter "N".

7 Claims, 3 Drawing Sheets

LIQUID CRYSTAL DISPLAY WITH ENHANCED CHARACTER VISIBILITY

BACKGROUND OF THE INVENTION

The present invention relates to liquid crystal displays (LCDs), and more specifically to an LCD with enhanced character visibility.

The LCD of the present invention has particular application in electronic price labels. EPL systems typically include a plurality of EPLs for merchandise items in a transaction establishment. EPLs typically display the prices of corresponding merchandise items on store shelves and are typically attached to a rail along the leading edge of the shelves. The EPLS are coupled to a central server from where information about the EPLs is typically maintained in an EPL data file. Price information displayed by the EPLs is obtained from a price look-up (PLU) data file and stored within an EPL price change record.

Since a transaction establishment may contain thousands of EPLs, the EPLs typically include low-cost components, including low-cost LCDs. The LCD of a typically EPL has segments which are either on or off. When turned on, a segment appears dark. When turned off, the segment appears semi-transparent. Alphanumeric characters have a maximum of seven segments. Special characters, such as the dollar and cents signs, require three additional segments. Thus, each character typically contains seven to twelve segments. The segments are physically separated from one another to provide paths for wiring to each segment. Thus, the term segment as used herein refers only to the areas of each character that appear dark when turned on.

Unfortunately, a typical low-cost LCD is difficult to read. Polarization limits visibility in both vertical and horizontal directions. Thus, use of such LCDs in EPLs requires customers to adjust viewing angle to clearly see prices along shelves and at different shelf heights. Also, activated segments appear uniformly dull to the eye.

Therefore, it would be desirable to provide an LCD with enhanced character visibility. It would also be desirable to provide an EPL containing an LCD with enhanced character visibility.

SUMMARY OF THE INVENTION

In accordance with the teachings of the present invention, a liquid crystal display (LCD) with enhanced character visibility is provided.

A liquid crystal display (LCDs) which has higher contrast characters than previously available LCDs, particularly LCDs used in electronic price labels. The LCD includes a number of characters containing segments including four vertical segments and three horizontal segments arranged in a figure-8 shape. The four vertical segments have a width determined by a segment width to character width ratio of about 0.208–0.283 and the three horizontal segments have a width determined by a segment height to character height ratio of about 0.100–0.150.

The LCD includes additional segments beyond the seven segments as necessary to display alphanumeric and special characters.

Thus, the LCD includes two vertical segments within the upper and lower portions of the figure-8 shape whose centerlines have been shifted to opposite sides of the character centerline to provide optimal visibility.

The LCD further includes two enhanced vertical segments whose shapes are determined jointly by two parallel lines.

It is accordingly an object of the present invention to provide an LCD with enhanced character visibility.

It is another object of the present invention to provide an LCD in which differences in segment widths are exaggerated to produce contrast.

It is another object of the present invention to provide an electronic price label (EPL) containing an LCD with enhanced character visibility.

It is another object of the present invention to provide an improved method of displaying certain characters.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1B:
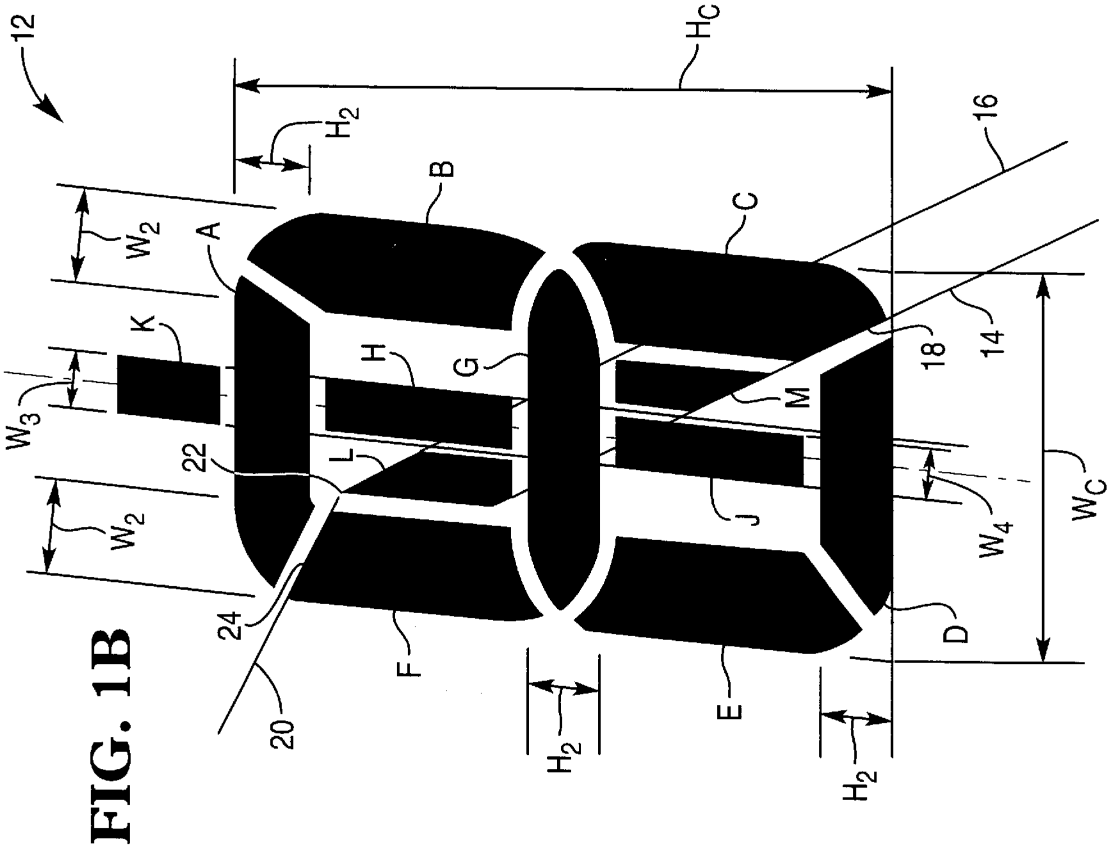
FIG. 1B is a diagram illustrating the segments of a character of the present invention.
Figure 1A:
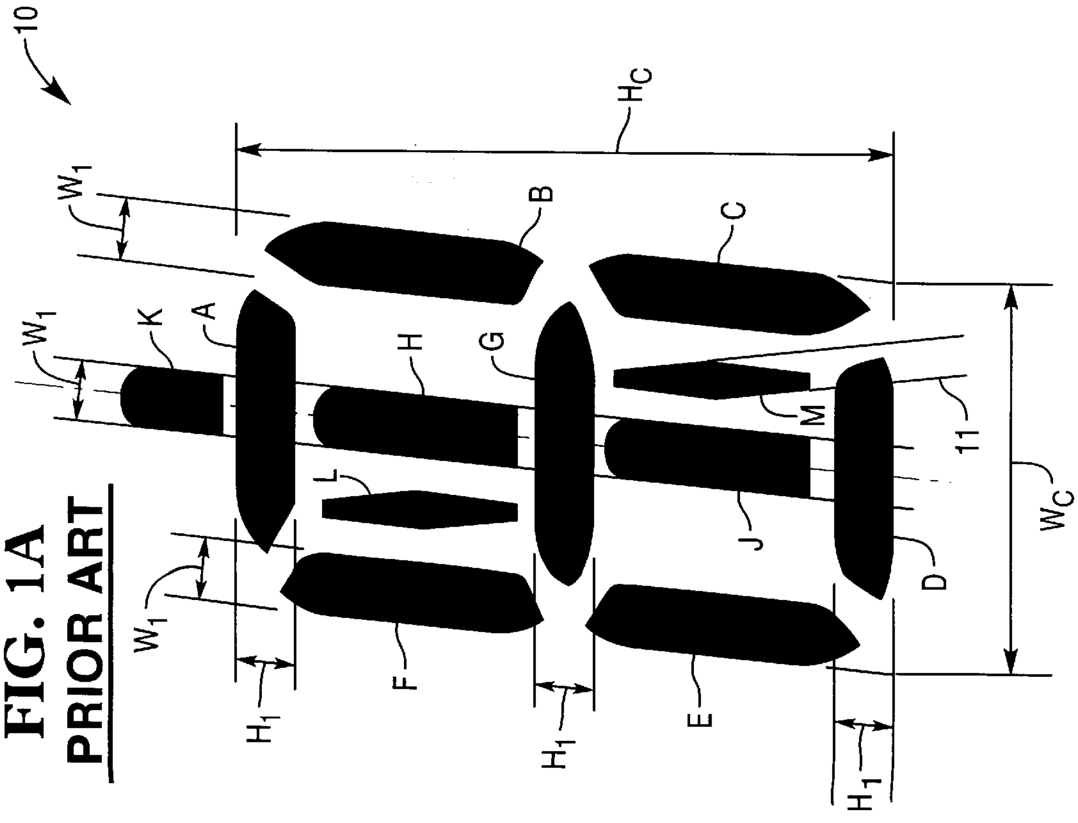
FIG. 1A PRIOR ART
FIG. 1A is a diagram illustrating the segments of a typical LCD character.

Turning now to FIGS. 1A and 1B, typical liquid crystal display (LCD) character segments are illustrated for comparison with the LCD segments of present invention. For purposes of illustration of both cases, character width Wc is referenced to 5.30 mm and character height Hc is referenced to 10.00 mm. These dimensions are typical of characters used in electronic price labels. The characters are drawn close to scale and appear substantially similar to real LCD displays.

A typical electronic price label includes eight characters. Each of the eight characters typically has seven to twelve segments. For example, characters used to display a dollar sign ($) or cents sign (¢) may be the only characters which have all of twelve segments.

With reference to FIG. 1A, segments of a typical LCD character 10 are well-aligned and segment thicknesses are substantially uniform and equal. All of segments A, B, C, D, E, F, G, H, J, and K are about 1.00 mm in thickness as illustrated. Width W1 and height H1 are substantially equal. Vertical segments H, J, and K are centered within character 10 about the character centerline CL. Diagonal segments L and M are located in upper and lower portions of character 10 and independently defined by different sets of parallel lines 11. Thus, diagonal segments L and M are not well-aligned with each other to form a diagonal line across character 12.

With reference to FIG. 1B, segments of LCD character 12 of the present invention vary in uniformity, thickness, and alignment to provide greater viewing contrast. Space between segments is minimized by using thicker segments than those in FIG. 1A.

In more detail, vertical segments B, C, E, and F are each 1.30 mm in width (W2). Horizontal segments A, G, and D are each 1.10 mm in height (H2). Vertical segment K is 80 mm in width (W3) and centered in character 12 along centerline CL. Vertical segment H is 0.70 mm in width (W4) and offset slightly to the right, rather than being centered in character 12. Vertical segment J is 0.70 mm in width (W4) and is offset slightly to the left, rather than being centered in character 12.

Diagonal segments L and M are jointly defined by two parallel lines 14 and 16. In order to make the letter N better-looking, line 14 is coincident with edge 18 of segment C, and line 16 crosses line 20 to form apex 22 of segment L. Line 20 is defined by edge 24 of segment F.

Ratios and differences may also be used to illustrate the relationships between the parts of the character segments. Ratios may be referenced to character height, character width, character area, or other segment thicknesses as necessary. If a character includes a non-uniform segment thickness, due to its shape (e.g., oval), then the ratios may envision the maximum thicknesses.

For example, as illustrated, the ratio of segment width to character width for vertical segments B, C, E, and F would be about 0.245. The ratio of segment width to character width for vertical segments H and J would be about 0.132. The ratio of segment width to character width for vertical segment K would be about 0.151. The ratio of segment height to character height for horizontal segments A, D, and G would be about 0.110.

The basic principles involved in designing character 12 include increasing the thickness of B, C, E, and F, decreasing the thicknesses of segments A, D, G, H, and J, and adjusting the positions of segments J and H. Given the constraints imposed by character boundaries, the design of one of the segments typically must and often necessarily does influence the design of the other segments.

Human factors studies show that the following ranges of ratio values produce minimal visually acceptable results (Table I). High end values within the ranges reflect the fact that, at some point, decreases in segment widths cannot further compensate for increases in other segment widths, and a character may become unreadable because too much of it is dark.

TABLE I

| Segment(s) | Ranges |
|---|---|
| B, C, E, F | 0.208–0.283 |
| J, H | 0.075–0.170 |
| K | 0.075–0.170 |
| A, D | 0.110–0.150 |
| G | 0.100–0.150 |

Human factors studies show that the following narrower ranges of ratio values produce better results (Table II).

TABLE II

| Segment(s) | Ranges |
|---|---|
| B, C, E, F | 0.226–0.267 |
| J, H | 0.094–0.151 |
| K | 0.132–0.170 |
| A, D | 0.110–0.130 |
| G | 0.101–0.120 |

Finally, human factors studies also show that the following ranges of ratio values produce optimal results (Table III).

TABLE III

| Segment(s) | Ranges |
|---|---|
| B, C, E, F | 0.245–0.267 |
| J | 0.125–0.132 |
| H | 0.132–0.137 |
| K | 0.132–0.151 |
| A, D | 0.110–0.122 |
| G | 0.101–0.115 |

Figure 2A:
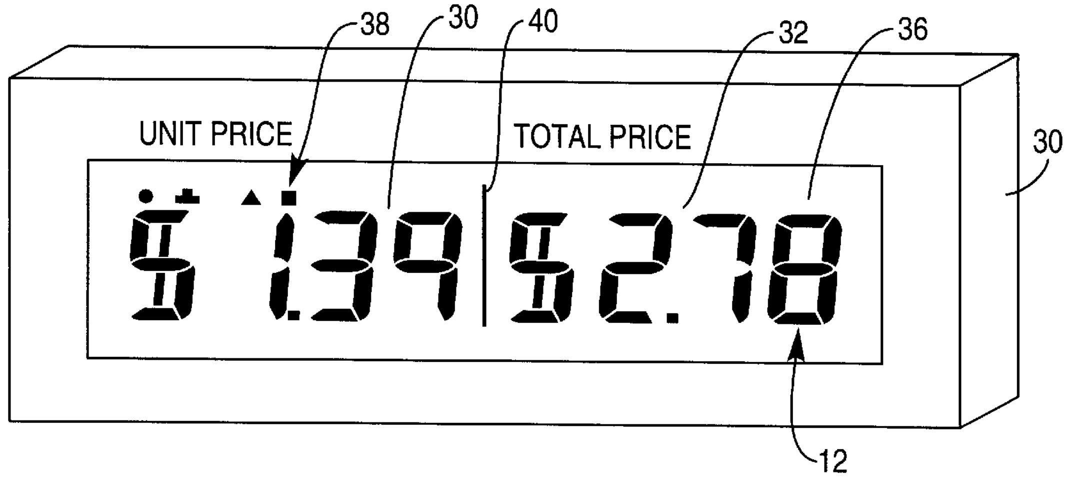
FIG. 2A is an EPL displaying a unit price and a price using the LCD of the present invention.
Figure 2B:
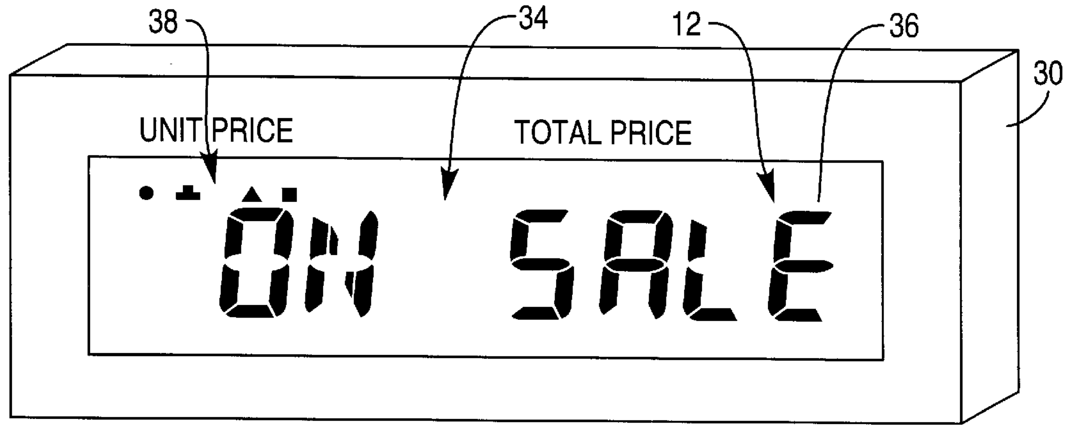
FIG. 2B is an EPL displaying a promotional message using the LCD of the present invention.

With reference to FIGS. 2A and 2B, LCD 36 is shown as part of EPL 30. LCD 36 is manufactured using known techniques. LCD 36 includes eight characters 12 as designed above. LCD 36 also includes special icons 38 and dividing lines 40.

With reference to FIG. 2A, LCD 36 is displaying a unit price 30 and a total price 32 by activating appropriate segments of the eight characters 12. Only segments within seven of characters 12 are visible.

With reference to FIG. 2B, LCD 36 is displaying a promotional message 34. Only segments within six of characters 12 are visible.

Figure 3:
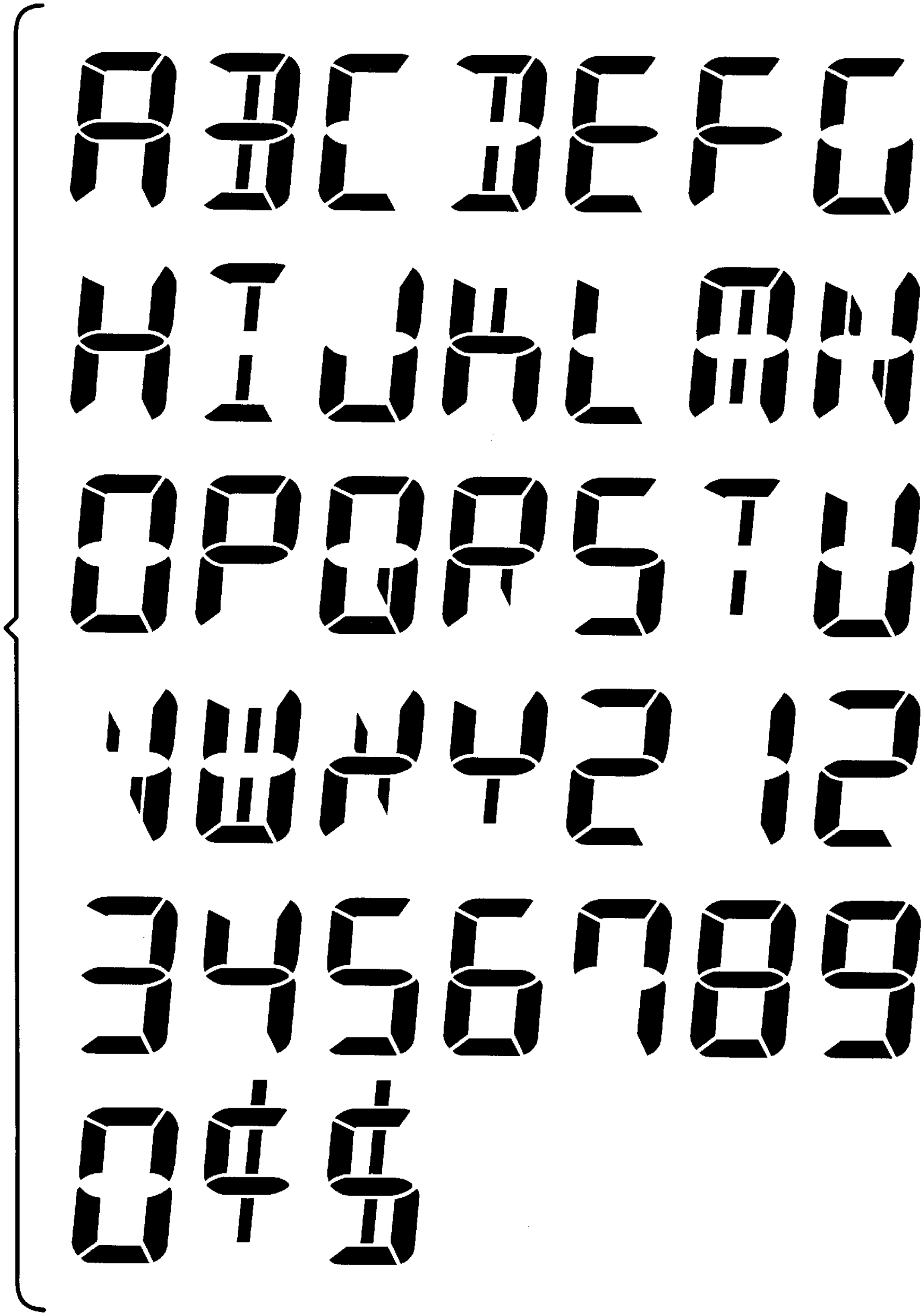
FIG. 3 is a diagram illustrating the appearance and creation of typical alphanumeric and special characters displayed by the LCD of the present invention.

Turning now to FIG. 3, a number of possible alphanumeric and special characters 12 are shown as they would appear on LCD 36.

Although the present invention has been described with particular reference to certain preferred embodiments thereof, variations and modifications of the present invention can be effected within the spirit and scope of the following claims.

What is claimed is:

1. A liquid crystal display comprising:

a number of characters having a character width and a character height and containing segments including four vertical segments and three horizontal segments arranged in a figure-8 shape, wherein the four vertical segments have a first vertical segment width of about 0.208–0.283 times the character width, and wherein the three horizontal segments have a horizontal segment height of about 0.100–0.150 times the character height;

a fifth vertical segment within a lower portion of the figure-8 shape having a second vertical segment width of about 0.075–0.170 times the character width, wherein the fifth vertical segment is centered to one side of a character vertical centerline; and a sixth vertical segment within an upper portion of the figure-8 shape having a third vertical segment width of about 0.075–0.170 times the character width, wherein the sixth vertical segment is centered to another side of the character vertical centerline opposite the one side.

2. The liquid crystal display as recited in claim 1, wherein the number of characters further comprise:

a seventh vertical segment above the figure-8 shape having a fourth vertical segment width of about 0.075–0.283 times the character width, wherein the seventh vertical segment is centered about the character vertical centerline.

3. The liquid crystal display as recited in claim 1, wherein the number of characters further comprise:

a first diagonal segment within a lower portion of the figure-8 shape located to a right side of a character vertical centerline; and a second diagonal segment within an upper portion of the figure-8 shape located to a left side of the character vertical centerline;

wherein the first and second diagonal segments are constrained by first and second diagonal parallel lines.

4. A liquid crystal display comprising:

a number of characters having a character width and a character height and containing segments including four vertical segments and three horizontal segments arranged in a figure-8 shape, wherein the four vertical segments have a first vertical segment width of about 0.245 times the character width, and wherein the three horizontal segments have a horizontal segment height of about 0.110 times the character height;

a first diagonal segment within a lower portion of the figure-8 shape located to a right side of a character vertical centerline; and a second diagonal segment within an upper portion of the figure-8 shape located to a left side of the character vertical centerline;

wherein the first and second diagonal segments are constrained by first and second diagonal parallel lines;

wherein the first diagonal line is coincident with a bottom edge of a lower right-side one of the four vertical segments; and wherein an intersection of the second diagonal line and a line coincident with a top edge of an upper left-side one of the four vertical segments determines an apex of the second diagonal segment.

5. A liquid crystal display comprising:

a number of characters having a character width and a character height and containing segments including four vertical segments and three horizontal segments arranged in a figure-8 shape, wherein the four vertical segments have a first vertical segment width of about 0.245 times the character width, and wherein the three horizontal segments have a horizontal segment height of about 0.110 times the character height;

a fifth vertical segment within a lower portion of the figure-8 shape having a second vertical segment width of about 0.132 times the character width, wherein the fifth vertical segment is centered to one side of a character vertical centerline;

a sixth vertical segment within an upper portion of the figure-8 shape having a third vertical segment width of about 0.132 times the character width, wherein the sixth vertical segment is centered to another side of the character vertical centerline opposite the one side;

a seventh vertical segment above the figure-8 shape having a fourth vertical segment width of about 0.151 times the character width, wherein the seventh vertical segment is centered about the character vertical centerline;

a first diagonal segment within a lower portion of the figure-8 shape located to a right side of a character vertical centerline; and a second diagonal segment within an upper portion of the figure-8 shape located to a left side of the character vertical centerline;

wherein the first and second diagonal segments are constrained by first and second diagonal parallel lines;

wherein the first diagonal line is coincident with a bottom edge of a lower right-side one of the four vertical segments; and wherein an intersection of the second diagonal line and a line coincident with a top edge of an upper left-side one of the four vertical segments determines an apex of the second diagonal segment.

6. An electronic price label comprising:

a liquid crystal display including a number of characters having a character width and a character height and containing segments including four vertical segments and three horizontal segments arranged in a figure-8 shape, wherein the four vertical segments have a first vertical segment width of about 0.245 times the character width, and wherein the three horizontal segments have a horizontal segment height of about 0.110 times the character height;

a fifth vertical segment within a lower portion of the figure-8 shape having a second vertical segment width of about 0.075–0.170 times the character width, wherein the fifth vertical segment is centered to one side of a character vertical centerline; and a sixth vertical segment within an upper portion of the figure-8 shape having a third vertical segment width of about 0.075–0.170 times the character width, wherein the sixth vertical segment is centered to another side of the character vertical centerline opposite the one side.

7. A method of displaying information by an electronic price label comprising:

activating a number of vertical segments within a figure-8 shaped character of a liquid crystal display within the electronic price label having a vertical segment width of about 0.245 times a width of the character;

activating a number of horizontal segments within the character having a horizontal segment height of about 0.110 times a height of the character; and activating a number of diagonal segments within the character including a first diagonal segment within a lower portion of the character located to a right side of a character vertical centerline; and a second diagonal segment within an upper portion of the located to a left side of the character vertical centerline;

wherein the first and second diagonal segments are constrained by first and second diagonal parallel lines;

wherein the first diagonal line is coincident with a bottom edge of a lower right-side one of four vertical segments; and wherein an intersection of the second diagonal line and a line coincident with a top edge of an upper left-side one of the four vertical segments determines an apex of the second diagonal segment.

* * * * *